United States Patent
Saffell et al.

(10) Patent No.: US 8,596,593 B2
(45) Date of Patent: Dec. 3, 2013

(54) WORKSURFACE LEG MOUNT SYSTEM

(75) Inventors: Mark Saffell, Manhattan Beach, CA (US); David Ritch, Venice, CA (US)

(73) Assignee: Krueger International, Inc., Green Bay, WI (US)

( * ) Notice: Subject to any disclaimer, the term of this patent is extended or adjusted under 35 U.S.C. 154(b) by 526 days.

(21) Appl. No.: 12/272,438

(22) Filed: Nov. 17, 2008

(65) Prior Publication Data
US 2009/0140110 A1 Jun. 4, 2009

Related U.S. Application Data

(60) Provisional application No. 60/991,533, filed on Nov. 30, 2007.

(51) Int. Cl.
| | |
|---|---|
| F16M 11/16 | (2006.01) |
| F16M 11/20 | (2006.01) |
| A47B 91/00 | (2006.01) |
| A47B 3/06 | (2006.01) |
| A47B 13/00 | (2006.01) |
| A47G 23/02 | (2006.01) |
| F16L 41/00 | (2006.01) |

(52) U.S. Cl.
USPC ............... 248/188; 248/188.1; 248/188.8; 248/151; 108/156; 108/158; 108/158.13; 108/186; 403/187; 403/188; 403/200

(58) Field of Classification Search
USPC .......... 248/188, 188.8, 188.1, 151, 677, 501; 108/153.1, 156, 157.1, 158, 157.18, 108/157.16, 158.11, 158.13, 186, 27; 403/187–188, 200
See application file for complete search history.

(56) References Cited

U.S. PATENT DOCUMENTS

| | | | | | |
|---|---|---|---|---|---|
| 705,653 | A | * | 7/1902 | Davis | 248/188.8 |
| 1,843,261 | A | * | 2/1932 | Bales | 248/188.9 |
| 2,809,876 | A | * | 10/1957 | Huff | 248/188 |
| 2,886,389 | A | * | 5/1959 | Meinhart | 248/188 |
| 2,904,379 | A | * | 9/1959 | Nelson | 403/297 |
| 3,005,612 | A | * | 10/1961 | Drezner et al. | 248/188 |
| 3,063,765 | A | * | 11/1962 | Huff | 248/188.8 |
| 3,267,888 | A | * | 8/1966 | Carlson | 108/158 |
| 3,391,660 | A | * | 7/1968 | Stewart | 108/158.11 |
| 3,443,530 | A | * | 5/1969 | Carlson | 108/156 |
| 3,516,633 | A | * | 6/1970 | Blackwood | 248/188 |
| 4,735,390 | A | * | 4/1988 | Richards | 248/188 |
| 4,925,140 | A | | 5/1990 | Camarota | |
| 5,165,349 | A | | 11/1992 | McAllister | |
| 5,934,630 | A | | 8/1999 | Williams et al. | |
| 5,988,077 | A | | 11/1999 | Balderi | |
| 6,547,196 | B2 | * | 4/2003 | Binnebose et al. | 248/188 |
| 6,629,506 | B2 | | 10/2003 | Park | |
| 6,869,245 | B2 | | 3/2005 | Cabiran | |
| 6,925,945 | B2 | | 8/2005 | Babick et al. | |
| 2003/0091386 | A1 | | 5/2003 | Ting | |

* cited by examiner

*Primary Examiner* — Terrell McKinnon
*Assistant Examiner* — Christopher Garft
(74) *Attorney, Agent, or Firm* — Andrus, Sceales, Starke & Sawall, LLP

(57) ABSTRACT

A worksurface leg mount is provided for interconnecting a support leg to a worksurface. The worksurface leg mount system includes an anchor plate attached to a lower surface of the worksurface, and a mounting plate attached to and optionally recessed in an upper end of the support leg. A fastener extends between and connects the anchor and mounting plates, which are spaced from each other. Loads that enter the mounting plate in discrete directions are transmitted through the fastener and into the anchor plate, where the loads are spread across the interfaces between the anchor plate and worksurface.

19 Claims, 2 Drawing Sheets

WORKSURFACE LEG MOUNT SYSTEM

CROSS REFERENCE TO RELATED APPLICATION

This application claims the benefit of U.S. Provisional Application No. 60/991,533, filed Nov. 30, 2007.

BACKGROUND OF THE INVENTION

This invention relates to furniture legs, and more particularly to joints for connecting legs to tabletops or worksurfaces.

Many known tables, for example, conventional wooden tables with wooden legs, include table bottom rails that extend from lower surfaces of tabletops or worksurfaces. In a typical four legged table, the table includes four table bottom rails arranged in a rectangular configuration that provides leg mounting structure at the interior of each of its four corners. In such known tables, upper ends of the legs are engaged within corners defined by interesting pairs of the table bottom rails. Fasteners are inserted through the table bottom rails and into sidewalls of the upper ends of the legs, anchoring the upper ends of the legs against the inwardly facing surface of the table bottom rails. Since the fasteners extend transversely through the table bottom rails and into the upper leg ends, the fasteners resist bending-type forces that tend to pull the upper leg end away from the tabletop or worksurface.

However, in many instances, table bottom rails are not desired or cannot be used in connecting a leg to a worksurface. Such instances include, for example, tables that have non-wooden legs, tables with designs that include thin profile worksurfaces with no ancillary downwardly extending structures, tables that require large amounts of user knee clearance, and/or others. Regardless of the particular reason for not including table bottom rails for mounting legs, tables that do not have such bottom rails typically include leg mounting plates at the joints between the worksurfaces and legs.

Typical leg mounting plates can be integrated into upper ends of the legs, or are separately mounted to the legs and the worksurface. The integrated and separately mounted leg mounting plates have mounting holes through which fasteners extend, for attaching the mounting plate to the worksurface. Typical leg mounting plates have an area that is larger than the upper end of the leg that attaches to the mounting plate. In this configuration, adequate clearances exist between the holes on the plate and the outer surface(s) in the leg to allow a user to first install the mounting plate to the leg, and then install the mounting plate and leg assembly to the worksurface. In other words, typical mounting plates are larger than the respective leg ends. The relatively larger mounting plates are at times visible, at least from certain view angles, when the table is completely assembled. Visually conspicuous mounting hardware such as mounting plates can distract from or compromise the appearance of the overall table or worksurface.

During use of such known mounting plates, when legs or the mounting plates are subjected to off-axis or bending-type forces, the forces tend to be directed or concentrated into certain ones of the fasteners holding the mounting plates to the worksurface. This unbalanced concentration of forces into one or few of the fasteners can cause the fastener(s) to loosen or withdraw from the worksurface and, correspondingly, the joint between leg and worksurface can fail.

It is an object of the present invention to provide a worksurface leg mount assembly that overcomes the aforementioned problems and issues with the prior art. It is another object of the invention to provide a worksurface leg mount assembly that distributes forces through the mount for balancing the application of such forces between the fasteners holding the mount assembly to the worksurface. It is yet a further object of the invention to provide a worksurface leg mount assembly that is visually concealed or visually inconspicuous during use.

SUMMARY OF THE INVENTION

In accordance with a first aspect of the present invention, a worksurface leg mount system interconnects a support leg to a worksurface. The worksurface leg mount system includes an anchor plate attached to a lower surface of the worksurface and a mounting plate attached to an upper end of the support leg. A fastener extends between and connects the anchor and mounting plates, and the mounting plate may be recessed into the upper end of the support leg. An upper edge of the support leg contacts the lower surface of the worksurface so that the anchor plate and support leg define concentrically spaced contact areas upon the lower surface of the worksurface.

The worksurface leg mount system transfers loads therethrough in a manner that can input a load applied to a discrete or localized segment of a support leg, and distribute the load for a balanced load application at a joint defined between (i) the support leg and/or worksurface leg mount system, and (ii) the worksurface. Forces that are applied to localized portions of the mounting plate are transferred through the fastener and dispersed through the anchor plate, mitigating localized concentrations of forces between the anchor plate and worksurface.

The anchor plate may include a captured nut that is positioned or sandwiched between it and the lower surface of the worksurface, and the nut accepts the fastener that extends between the anchor plate and mounting plate. The captured nut can be aligned with a longitudinal axis of the support leg, ensuring that the fastener is also longitudinally aligned with the support leg. The anchor plate may also include multiple throughbores that allow multiple fasteners to pass through the plate and secure into the worksurface.

The anchor and mounting plates may be spaced from each other and may have substantially the same profile shape, when viewed in a transverse cross-section. Accordingly, each of the anchor and mounting plates can have inner and outer segments that are parallel to each other, and a medial segment that tapers or angularly extends between the respective inner and outer segments.

The worksurface leg mount system is entirely visually concealed by the upper end of the support leg. The upper end of the support leg may be bell-shaped or fluted outwardly, providing adequate inside clearance to house all of the components of the worksurface leg mount system.

In accordance with yet another aspect of the present invention, the forces applied to the support leg are converted to axially directed movement of the fastener and/or anchor plate. Converting forces and loads applied to the support legs into axially directed forces applied to the fastener and anchor plate allow a resultant force to pull nearly straight against the anchor plate, balancing the load application at the interface between the anchor plate and the worksurface. This construction mitigates the likelihood of high load concentrations being realized at, e.g., one or two but not all of the fasteners or other mounting hardware that secures the anchor plate to the worksurface. In other words, forces that are applied non-uniformly to the mounting plate are distributed relatively more uniformly through the anchor plate. Loads that tilt the support leg away from a resting state axial alignment with respect to the worksurface can be converted by at least one of the mounting plate, the anchor plate, and the plate coupling fastener, into a pulling force which urges the anchor plate perpendicularly away from the worksurface. In this regard, loads that tilt or bend a support leg away from its resting state axial alignment with respect to the worksurface are distributed through the anchor plate in a manner that generally balances and equalizes such force(s) through the multiple fasteners that secure the anchor plate to the worksurface.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
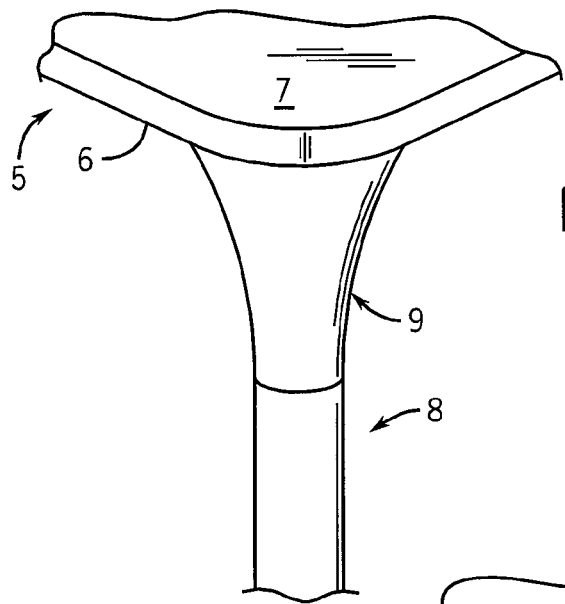
FIG. 1 is an isometric view of a corner of a worksurface incorporating the worksurface leg mount assembly features of the present invention.
Figure 2:
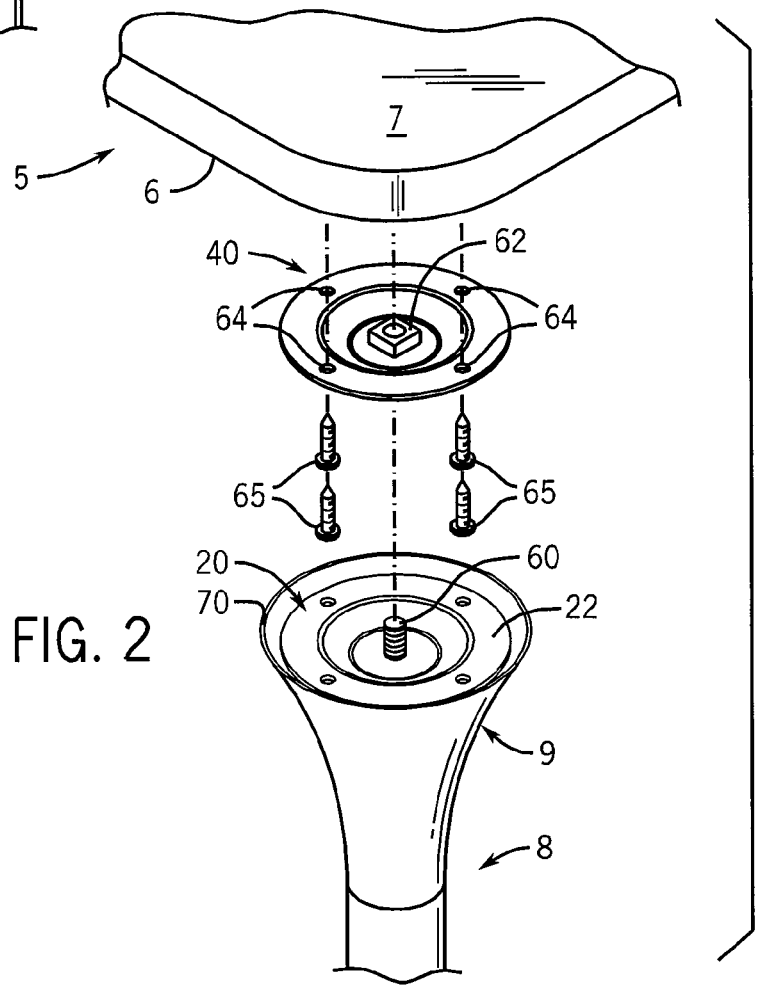
FIG. 2 is a an exploded isometric view of the worksurface leg mount assembly of FIG. 1.

Referring to FIGS. 1 and 2, a worksurface leg mount system 10 is provided for attaching a support leg 8 to a worksurface 5. Worksurface 5 can be any of a variety of suitable generally planar worksurfaces, e.g., tabletops, desktops, workbench tops, and/or others. When assembled, the worksurface 5 defines a downwardly facing lower surface 6 and an opposing, upwardly facing, upper surface 7.

Each of support legs 8 has an upper end with an outwardly flaring circumferential sidewall 9 with a circular upper perimeter shape, whereby the upper end sidewall 9 can be generally bell-shaped or appear fluted in cross-section. In some implementations, the upper end or the entire length of support leg 8 can be hollow. The hollow configuration or void space within leg 8 allows the worksurface leg mount system 10 to be housed therein, entirely visually concealed in the complete assemblage. When the worksurface leg mount system 10 is completely housed within the upper end of support leg 8, an upper edge of the leg 8 directly abuts a lower surface 6 of the worksurface 5.

Worksurface leg mount system 10 is adapted and configured to distribute loads generally uniformly through an interface of the worksurface 5 and each support leg 8, and each includes a mounting plate assembly 20 and an anchor plate assembly 40. The mounting plate and anchor plate assemblies 20 and 40 cooperate so that during use, loads are distributed and balanced between multiple fasteners that secure the anchor plate assembly 40 to the lower surface 6 of worksurface 5.

Still referring to FIGS. 1 and 2, within the worksurface leg mount system 10, the mounting and anchor plate assemblies 20 and 40 interact with each other so that angular movement of the mounting plate 20 is converted to rectilinear movement of the anchor plate 40 in a direction that is normal to the lower surface 6 of worksurface 5. Stated another way, worksurface leg mount system 10 converts substantially all loads that are encountered by the mounting plate 20 into pulling forces that pull the anchor plate 40 at its center, directly away from the worksurface 5. The particular manner(s) in which this is accomplished will later be explained in greater detail.

Figure 3:
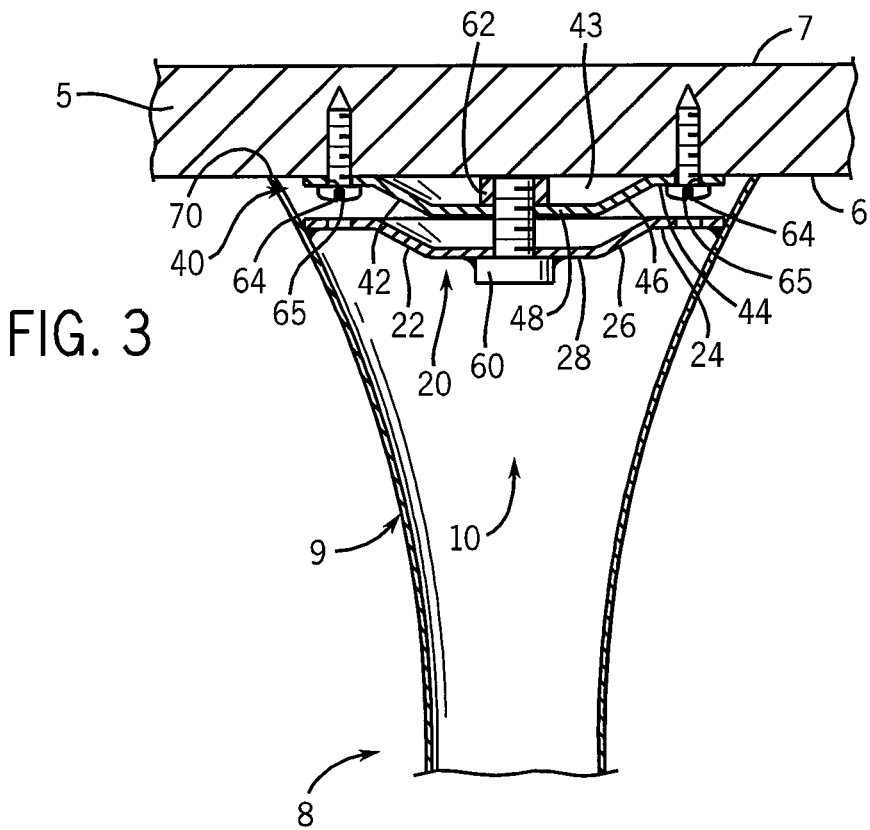
FIG. 3 is a cross-sectional view of the work surface leg mount assembly of FIG. 1.
Figure 4:
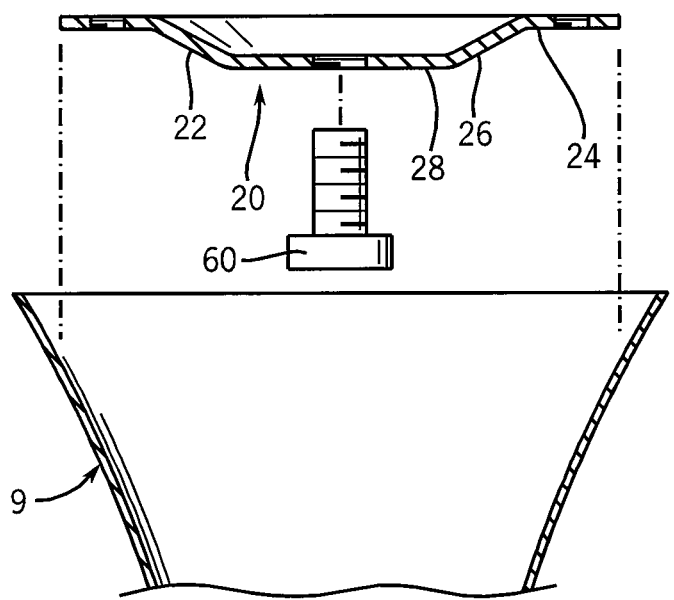
FIG. 4 is an exploded cross-sectional view of the isometric view of a leg and mounting plate assembly base as in FIG. 3.

Referring now to FIGS. 2 and 3, mounting plate assembly 20 includes a dished mounting plate 22, which has a generally circular perimeter or is disc shaped, and a plate coupling fastener, e.g., fastener 60, extending therefrom. The disc-shaped mounting plate 22 is generally concave and defines concentrically distinct segments, namely, a horizontally extending outer segment 24, a sloping medial segment 26, and a horizontally extending inner segment 28. The outer perimeter of the outer segment 24 is free of any upturned edge or flange. The medial segment 26 extends at an angle downwardly and inwardly from the outer segment 24 to the inner segment 28. While the mounting plate 22 is illustrated as having a circular shape, it should be understood that mounting plate 22 may have any other desired shape. Most desirably, the shape of the mounting plate 22 conforms to the cross-sectional shape of the upper end of leg 9 within which mounting plate 22 is received.

Outer segment 24 of mounting plate 22 is in the form of an annular ring that nests in a recessed fashion within the end of leg 8. Preferably, outer segment 24 is welded or otherwise fixed, at its outer perimeter, to the inner surface of the outwardly flaring circumferential sidewall 9 of leg 8. The outer segment 24 is generally parallel to the lower surface 6 of worksurface 5, and is relatively nearer the lower surface 6 than the remainder of mounting plate 22.

Medial segment 26 is a conical frustum that extends from the inner perimeter of outer segment 24, inwardly further into the support leg 8. The medial segment 26 and inner segment 28, in combination, define the concave portion of mounting plate 22.

Inner segment 28 extends from the inner perimeter of medial segment 26, whereby it is circular and parallel to outer segment 24 and lower surface 6 of worksurface 5. A threaded throughbore extends axially through the middle of inner segment 28, and is adapted and configured to accept fastener 60 therethrough.

Fastener 60 extends from the back side of mounting plate 22, through the inner segment 28 throughbore and outwardly toward the lower surface 6 of worksurface 5. In this configuration, a head of fastener 60 interfaces with the downwardly facing surface of inner segment 28. Optionally, fastener 60 can be, e.g., a threaded stem extending from mounting plate 22, or other suitable hardware for coupling mounting plate assembly 20 with anchor plate assembly 40.

Anchor plate assembly 40 includes a dished anchor plate 42 which is generally circular or disc shaped, a nut 62, and fasteners 65. The disc-shaped anchor plate 42 is generally concave and, like plate 22, defines concentrically distinct segments, namely, an outer segment 44, a medial segment 46, and an inner segment 48. The anchor plate 42 and the mounting plate 22 have substantially the same uniform thickness.

Outer segment 44 is in the form of an annular ring that is configured to engage the lower surface 6 of worksurface 5 in a face-to-face relationship. Multiple apertures 64 extend through the outer segment 44, spaced from each other about the perimeter of outer segment 44. The apertures 64 are adapted and configured to receive fasteners 65 therethrough, which hold the outer segment 44 and thus the anchor plate 42 against the lower surface 6 of worksurface 5.

Similar to medial segment 26 of mounting plate 22, medial segment 46 of anchor plate 42 is a conical frustum that extends from the inner perimeter of outer segment 44, outwardly away from lower surface 6 of worksurface 5. Inner segment 48 extends from the inner perimeter of medial segment 46, whereby it is circular and parallel to outer segment 44 and displaced furthest from lower surface 6 of worksurface 5. The medial segment 46 and inner segment 48, in combination, define the convex portion of anchor plate 42, and a void 43 between (i) the medial and inner segments 46, 48, and (ii) the lower surface 6 of worksurface 5. A throughbore extends axially through the middle of inner segment 48, and is adapted and configured to accept threaded fastener 60 therethrough, in the complete assemblage of the worksurface leg mount system 10.

Still referring to FIG. 2, nut 62 is housed within void 43, and is sandwiched between the facing surfaces of lower surface 6 of worksurface 5, and inner segment 48 of anchor plate 42. As will be understood below, nut 62 is movable into and out of engagement with lower surface 6 in response to loads imposed upon support leg 8. A threaded bore of nut 62 is coaxially aligned and registered with the bore of anchor plate 42, whereby the nut is suitably registered to threadedly receive fastener 60. Preferably, nut 62 is, e.g., a captured nut so that it is fixed to the anchor plate 42 and cannot rotate or otherwise move with respect to anchor plate 42.

In this configuration, the support leg 8 is mounted to the worksurface by turning the fastener 60 of the mounting plate assembly 20 into the nut 62 of the anchor plate assembly 40, by rotation of leg 8. When worksurface leg mount system 10 is fully assembled, an upper edge 70 of the support leg 8 contacts and locks against the worksurface 5, and the mounting plate assembly 20 remains displaced from the anchor plate assembly, defining a clearance therebetween. In other words, the mounting and anchor plates 20, 40 are axially spaced from each other, along the length of fastener 60. Mounting plate 20 lies entirely beneath anchor plate 40 as seen in FIG. 3. In this configuration, the support leg 8 and worksurface leg mount system 10 together contact lower surface 6 of worksurface 5 by way of, for example, three concentrically spaced annular contact interfaces; namely, (i) the uppermost edge 70 of outwardly flaring circumferential sidewall 9 of support leg 8, (ii) the outer segment 44 of anchor plate 42, and (iii) the end of nut 62, optionally, also at the circular end of fastener 60.

The bell or flare shape defined by the sidewall 9 at the upper end of leg 8 enables the mounting and anchor plate assemblies 20 and 40 to be fully concealed within the interior defined by the upper end of leg 8 when leg 8 is connected to worksurface 5 as described above. That is to say, the flared or expanded construction of the upper end of leg 8, together with the low profile of mounting and anchor plate assemblies 20 and 40, are such that the mounting and anchor plate assemblies 20 and 40 are received within the interior of the upper end of leg 8 when leg 8 is advanced so as to bring the upper edge of leg 8 into contact the underside of worksurface 5. In this manner, the exterior surfaces of sidewall 9 of leg 8 conceal mounting and anchor plate assemblies 20 and 40, providing a simple, clean look to the assembled worksurface 5 and leg 8.

In light of the overall configuration of worksurface leg mount system 10, loads that are applied to upper surface 7 of work surface 5 and/or through support legs 8, are distributed and generally equalized or balanced through the worksurface leg mount system 10, providing a uniform transfer of force through the worksurface leg mount system 10 and thus between the support leg 8 and worksurface 5. This mitigates the likelihood of loads applied to the worksurface 5 being manifested as localized applications of large forces at discrete points or portions of the support leg 8 or worksurface leg mount system 10, and correspondingly reduces the likelihood of fasteners 65 being pulled from the worksurface 5.

Accordingly, when a load is applied to the worksurface 5 outside of the upper edge perimeter of support leg 8, it is distributed through the entire anchor plate assembly 40. Specifically, under such conditions, the mounting plate assembly 20 tends to pivot with the support leg 8, which transfers a force axially through fastener 60, away from the lower surface 6 of worksurface 5. Correspondingly, fastener 60 pulls axially against the nut 62. This urges the anchor plate 42 away from the worksurface in a uniform manner across its surface, in response to being pulled out from the center. As a result of this outward force applied to the center of the anchor plate, the forces and thus the load are distributed equally through all of the fasteners 65 about the perimeter of the anchor plate 42.

Transferring misaligned loads through support leg 8, e.g., bending or torsional forces applied to support leg 8, to primarily axially directed movement of fastener 60 can be realized, at least in part, due to the integrity of the threaded coupling of fastener 60 and nut 62. When fastener 60 is threaded into nut 62, it moves only in unison therewith. Because nut 62 is fixed to anchor plate 42 and securely captured in the void between the anchor plate 42 and the worksurface 5, relatively less force is required to flex the mounting plate 22 than is required to pivot the nut 62 away from the worksurface. Thus, when a torsional force is applied to support leg 8, or a load is misaligned with respect to support leg 8, the mounting plate 22 flexes and resiliently deforms because the fastener 60 resists radial movement. However, fastener 60 is axially urged away from the worksurface 5 as a function of, for example, the vector component of the force which extends normal the lower surface 6, pulling the inner segment 48 away from lower surface 6 and uniformly distributing the force radially through the anchor plate 42. As a result of this outward force applied to the inner segment 48 of the anchor plate 42, the forces and thus the load are distributed equally through all of the fasteners 65 about the perimeter of the anchor plate 42.

Furthermore, it is noted that if a load is applied transversely against a portion of the support leg 8, the leg 8 tends to bend in the same general direction which correspondingly drives the upper edge of the bell-shaped or outwardly flaring sidewall 9 on the opposite side of the leg 8 into the lower surface 6 of worksurface 5. In other words, pushing against the leg 8 tends to (i) lift a portion of the upper end sidewall 9 edge that faces the pushing force, and (ii) drive the opposing portion of the upper end sidewall 9 edge into the worksurface 5.

In such configuration, the support leg 8 and the mounting plate assembly 40 serve as a lever, e.g., cooperate as a second class lever system, lifting or pulling the captured nut 62 away from the worksurface 5. Accordingly, a portion of anchor plate 42 which is radially aligned with the edge of leg 8 that is driven into worksurface 5, is levered at least somewhat upwardly as the leg 8 tends to pivot about the edge that is driven into the worksurface. This creates a resultant load pulling the anchor plate 42 nearly straight down when the table is in its typical upright orientation. Accordingly, by providing respective mounting and anchor plates 22 and 42 that may have the same perimeter shapes and dished concave construction and are only connected to each other at their respective centers, regardless of the particular angle of load input, a load that enters leg 8 and is directed in primarily a single direction passes through the anchor plate 22, concentrates into, and is transmitted through fastener 60. Fastener 60 focuses and transmits the load to nut 62 and the center of anchor plate 42, where the load is then distributed and radiates through the anchor plate 42 so that it is generally equalized or balanced between the fasteners 65. This prevents localized unbalanced loading between the various fasteners 65.

While the sidewall 9 at the upper end of leg 8 is illustrated as having a bell or flared shape, it is understood that the upper end of leg 8 may have any desired shape or configuration as long as it defines an interior area with sufficient clearance to receive the mounting and anchor plate assemblies 20 and 40 when the leg 8 is advanced into engagement with the underside of worksurface 5. The leg 8 may be constructed so that the lower area has a diameter or transverse dimension less than the upper end as shown, or may have a construction in which the lower and upper areas have the same diameter or transverse dimension. It can thus be appreciated that the leg mount system of the present invention provides a great deal of design flexibility for the leg, while providing a secure and concealed connection of the leg to the worksurface.

In addition, while the drawings illustrate the leg 8 as extending from the underside of the worksurface 5 in a perpendicular orientation, it is understood that the leg 8 may also be canted or angled relative to the worksurface 5. In a construction such as this, the mounting plate assembly 20 is positioned within the angled upper end of the leg in the same orientation as shown and described, and the longitudinal axis of the leg extends at an angle relative to the plane of the mounting plate assembly 20. In a construction such as this, the mounting plate assembly 20 may have a modified shape, e.g. an elliptical shape, in order to conform to the configuration of the upper end of the leg 8.

Various alternatives and embodiments are contemplated as being within the scope of the following claims, which particularly point out and distinctly claim the subject matter regarded as the invention.

We claim:

1. A worksurface leg mount system for connecting a support leg to a worksurface, comprising:
   an anchor plate attached to a lower surface of the worksurface by a fastener arrangement and having,
   (i) an outer segment contacting the lower surface of the worksurface, and
   (ii) an inner segment that is spaced from the lower surface of the worksurface;
   a support leg having an upper edge engaging the lower surface of the worksurface;
   a resiliently deformable mounting plate attached to and recessed in an upper end of the support leg, the mounting plate having a horizontally extending inner segment, a horizontally extending outer segment forming a mechanical attachment to an inner surface of the support leg and free of any upturned edge, and a sloping medial segment extending downwardly and inwardly from the outer segment to the inner segment; and
   a fastener extending between and connecting the anchor plate and mounting plate, wherein the anchor plate outer segment and support leg upper edge define concentrically spaced contact areas against the lower surface of the worksurface, and
   a captured nut attached to the inner segment of the anchor plate, the captured nut (i) being positioned between the anchor plate and the lower surface of the worksurface and in contact with the lower surface of the worksurface, and (ii) accepting the fastener that extends between the anchor plate and mounting plate, the nut being movable out of engagement with the lower surface of the worksurface in response to loads imposed upon the support leg,
   wherein the anchor plate and the mounting plate have substantially the same uniform thickness and the same dished concave construction.

2. The worksurface leg mount system of claim 1, wherein the mounting plate lies entirely spaced beneath the anchor plate, and flexes to aid in distributing and balancing forces applied to the support leg.

3. The worksurface leg mount system of claim 1, wherein the captured nut is aligned with a longitudinal axis of the support leg.

4. The worksurface leg mount system of claim 3, wherein multiple throughbores extend through the outer segment of the anchor plate.

5. The worksurface leg mount system of claim 4, wherein multiple fasteners extend through the throughbores, connecting the anchor plate to the worksurface.

6. The worksurface leg mount system of claim 1, wherein the outer segment and the inner segment of the anchor plate extend horizontally relative to the worksurface, and the anchor plate includes a medial segment in the form of a conical frustum that connects the outer and inner segments thereof.

7. The worksurface leg mount system of claim 6, wherein a void is defined between (i) the inner segment of the anchor plate, and (ii) the lower surface of the worksurface.

8. The worksurface leg mount system of claim 7, wherein a void is defined between (i) the medial segment of the anchor plate, and (ii) the lower surface of the worksurface.

9. The worksurface leg mount system of claim 6, wherein the horizontally extending inner segment of the mounting plate is parallel to and spaced from the inner segment of the anchor plate.

10. The worksurface leg mount system of claim 6, wherein the medial segment of the mounting plate takes the form of a conical frustrum that is parallel to and spaced from the medial segment of the anchor plate.

11. The worksurface leg mount system of claim 6, wherein the horizontally extending outer segment of the mounting plate is parallel to and spaced from the outer segment of the anchor plate.

12. The worksurface leg mount system of claim 1, wherein a longitudinal cross-section of the upper end of the support leg defines an outwardly fluted perimeter shape.

13. The worksurface leg mount system of claim 3, wherein the anchor plate and mounting plate are visually concealed by the upper end of the support leg.

14. A method of mounting a worksurface leg to a worksurface, comprising the acts of:
   securing an anchor plate to a lower surface of the worksurface;
   connecting a resiliently deformable mounting plate, which is attached to an upper end of the leg, to the anchor plate using a fastener extending between the anchor plate and mounting plate, wherein the mounting plate is secured to the anchor plate so that a space is defined therebetween, the mounting plate having a horizontally extending inner segment, a horizontally extending outer segment forming a mechanical attachment to an inner surface of the support leg and free of any upturned edge, and a sloping medial segment extending downwardly and inwardly from the outer segment to the inner segment, and
   attaching a captured nut that receives the fastener to the anchor plate such that the nut is in contact with the lower surface of the worksurface and is movable out of engagement with the lower surface of the worksurface in response to loads imposed upon the worksurface leg,
   wherein forces applied to the leg are converted to axially directed movements of the fastener, and wherein the anchor plate and the mounting plate have substantially the same uniform thickness and the same dished concave construction.

15. The method of claim 14, wherein bending movements of the mounting plate are converted to axially directed forces passing through the fastener.

16. The method of claim 15, wherein the axially directed forces passing through the fastener are distributed radially through the anchor plate.

17. A worksurface leg mount system for connecting a support leg to a worksurface, comprising:
   an anchor plate having opposing surfaces and being secured to a worksurface by multiple fasteners;
   a nut fixed to one of the opposing surfaces of the anchor plate and in contact with a lower surface of the worksurface;
   a resiliently deformable mounting plate coaxially aligned with and spaced from the anchor plate, the mounting plate being secured to an upper end of a support leg that supports the worksurface, the mounting plate having a horizontally extending inner segment, a horizontally extending outer segment forming a mechanical attachment to an inner surface of the support leg and free of any upturned edge, and a sloping medial segment extending downwardly and inwardly from the outer segment to the inner segment; and
   a plate coupling fastener extending through the mounting plate and the anchor plate and received by the nut, the plate coupling fastener transferring forces between the anchor and mounting plates, the nut being movable out of engagement with the lower surface of the worksurface in response to loads imposed on the support leg,
   wherein the anchor plate and the mounting plate have substantially the same uniform thickness and the same dished concave construction, and
   wherein forces that are applied non-uniformly to the mounting plate are distributed relatively more uniformly through the anchor plate.

18. The worksurface leg mount system of claim 17, wherein loads that tilt the support leg away from a resting state axial alignment with respect to the worksurface are converted by at least one of the mounting plate, the anchor plate, and the plate coupling fastener into a pulling force that urges the anchor plate perpendicularly away from the worksurface.

19. The worksurface leg mount system of claim 18, wherein the pulling force is distributed through the anchor plate and equalized through the multiple fasteners securing the anchor plate to the worksurface.

* * * * *